United States Patent [19]

Ward et al.

[11] Patent Number: 4,894,770
[45] Date of Patent: Jan. 16, 1990

[54] SET ASSOCIATIVE MEMORY

[75] Inventors: Stephen A. Ward, Chestnut Hill; Robert C. Zak, Somerville, both of Mass.

[73] Assignee: Massachusetts Institute of Technology, Cambridge, Mass.

[21] Appl. No.: 57,272

[22] Filed: Jun. 1, 1987

[51] Int. Cl.⁴ .............................................. G11C 7/00
[52] U.S. Cl. .............................. 364/200; 364/239.4; 364/243.41; 365/230.03
[58] Field of Search ... 364/900 MS File, 200 MS File; 365/200 MS File, 220 MS File, 230 MS File, 230.03, 230.08, 189.05

[56] References Cited

U.S. PATENT DOCUMENTS

| | | | |
|---|---|---|---|
| 4,104,719 | 8/1978 | Chu et al. | 364/200 |
| 4,110,842 | 8/1978 | Sarkissian et al. | 365/233 |
| 4,156,938 | 5/1979 | Proebsting et al. | 365/205 |
| 4,355,377 | 10/1982 | Sud et al. | 365/190 |
| 4,542,454 | 9/1985 | Brcich et al. | 364/200 |
| 4,577,293 | 3/1986 | Matick et al. | 365/189 |
| 4,616,310 | 10/1986 | Dill et al. | 364/200 |
| 4,636,987 | 1/1987 | Norwood et al. | 365/208 |
| 4,649,516 | 3/1987 | Chung et al. | 364/900 |
| 4,672,614 | 6/1987 | Yoshida | 371/13 |
| 4,725,945 | 2/1988 | Kronstadt et al. | 364/200 |

OTHER PUBLICATIONS

James R. Goodman and Men–chow Chiang, "The Use of Static Column RAM as a Memory Hierachy," 11th Annual Symposium on Computer Architecture, Jun. 5–7, 1984, Ann Arbor, Mich., IEEE Computer Society Press, pp. 167–174.

Naoya Ohno and Katsuya Hakozaki, "Pseudo Random Access Memory System with CCD-SR and MOS RAM on a Chip," 15th IEEE Computer Society International Conference, Washington, DC, Sep. 6–9, 1977, pp. 153–156.

Stephen A. Ward and Robert C. Zak, "Static–column RAM as Virtual Cache," Massachusetts Institute of Technology (not published).

Peter Bagnall and Charles Furnweger, "CMOS 64k RAM Mates Static Speed With Dynamic Density," *Electronic Design*, Jul. 25, 1985, pp. 117–120, 122 and 124.

W. J. Dally, L. Chao, A. Chien, S. Hassoun, W. Horwat, J. Kaplan, P. Song, B. Totty, S. Wills, "Architecture of a Message-Driven Processor," 14th Annual Symposium on Computer Architecture, Pittsburgh, Pa., Jun. 2–5, 1987, pp. 189–196.

George Heilmeier, "Memory Technology," *Electronic Engineering Times*, Issue #460, Nov. 16, 1987, pp. A30–A31.

*Primary Examiner*—Gareth D. Shaw
*Assistant Examiner*—Debra A. Chun
*Attorney, Agent, or Firm*—Hamilton, Brook, Smith & Reynolds

[57] ABSTRACT

In a random access memory, a dynamic memory array is associated with static data buffers. Each static data buffer is connected to the memory array to receive and store a row of data from any addressed row of the array. When an address is received, it is compared with addresses stored in registers and associated with the data stored in the static buffers. Where there is a match, a controller is able to select the data buffer in which the row of data is stored for a column strobe operation without the need for a row address strobe operation. The resultant system provides for a set associative cache coupled to the dynamic memory array. Further, the comparison can be made of virtual addresses for a cache system which responds to virtual addresses.

41 Claims, 3 Drawing Sheets

SET ASSOCIATIVE MEMORY

The Government has rights in this invention pursuant to Contract No. N00014-84-K-0099 awarded by the Department of the Navy.

BACKGROUND OF THE INVENTION

Cache memories are widely used in contemporary computer systems to improve, on a statistical basis, the effective access time between a precessor and main memory. The typeical cached system uses a modest amount of fast-access static RAM as a buffer between the processor and a much larger array of slower, denser dynamic RAM devices. The benefit of a large cache is average access times approaching that of the fast static memory. Its costs include the static RAM whose contents are redundant with the selected portions of dynamic memory, additional tag memory used in recording addresses of cache contents, and comparators and other associated logic.

Modern static column dynamic RAM (SCRAM) chips combine a fast static row buffer with a much larger dynamic charge array. An entire row of the two-dimensional array, dictaterd by high-order address bits, is loaded into the row buffer on the row address strobe (RAS) signal. Subsequent accesses to memory elements within that row may be made at static RAM speeds since they deal only with the static buffer. The effect is to achieve very fast access times to consecutive locations within the same row, while exploiting DRAM densities for the bulk of the memory.

The static row buffer is reminiscent of a cache, and its use as such has been proposed by Goodman and Chiang, "The Use of Static Column RAM as a Memory Hierarchy", The 11th Annual Symposium on Computer Architecture, IEEE Computer Society Press, 1984, pp. 167–174. In the Goodman-Chiang system, each of several banks of static column RAM has an associated location in a tag memory. The tag memory records the currently buffered row address for each memory bank, and the system avoids the RAS time overhead when a new memory transaction references the same row as the last transaction to that bank. The high-order address bits of an incoming transaction dictate the affected memory bank and consequently the tag memory location to be accessed. The remaining address bits comprise a row address and a column address, the latter being consigned to the low order. If the fetched tag memory contents match the incoming row address bits, a static column "hit" takes place: the column address bits are used to address the requested location in the current row buffer of the selected bank. Otherwise, a slower "miss" ensues: a RAS cycle is used to store the current row back into the charge array and to fetch the row indicated by the new row address.

Since only the column address is needed to initiate a static-column access, read transactions may overlap tag memory access with interrogation of the row buffer on the optimistic expectation of a hit. Thus in this most common case, the major time cost of a read hit is just the static column access time which is similar to that of a conventional cache consisting of separate static RAM.

DISCLOSURE OF THE INVENTION

The Goodman-Chiang approach suffers several disadvantages relative to conventional cache systems. For one, the approach necessarily results in a direct mapped type of cache. Where two or more frequently accessed locations reside in different rows within the same memory bank, the system may take little advantage of the row buffers because data from different rows must alternately be stored in the buffer. This results in a significant reduction in overall performance. Further, the SCRAM chips of Goodman and Chiang are addressed by physical memory addresses, so the delay of converting virtual memory addresses to physical memory addresses through a memory management unit is required for all accesses to memory in a virtual address system. Finally, the total effective cache size is dictated by the size of the RAM static row buffers and is typically smaller than desirable.

In a memory system according to the present invention, a dynamic memory array of storage elements logically arranged as rows and columns is associated with a plurality of data buffers. Each row of storage elements is directly accessible independent of other rows of the array. Each data buffer is connected to the memory array to receive and store a row of data from any addressed row of the array and to provide data as an output of the memory. Any one of the row buffers can be selected by a controller to receive and store data. The controller responds to a comparison of a received address with each of plural addresses stored in address registers. The addresses stored in the address registers define the rows of data stored in the data buffers. The controller causes a read from the memory array to a selected buffer where the row being accessed was not previously stored in the data buffer. However, where the data has been previously stored in the buffer, the controller selects that buffer for direct output or input.

Preferably, the memory array and data buffers are formed together on a memory chip, and the controller is provided on a separate controller chip. The controller chip may be connected to simultaneously control each chip of a bank of memory chips. Alternatively, the controller and memory array may be included on a single chip. In any case, the row addresses may be stored in plural registers on the memory chip; the registers are selectable as the data buffers are selected to address the memory array.

The system may also allow for direct accessing of data stored in the row buffers based on virtual memory addresses. To that end, the controller may include plural virtual address registers. As the physical address is generated by a memory management unit, the virtual address can be compared with each of the previously registered virtual addresses which correspond to the data in the data buffers. If there is a match, the controller can select the proper data buffer even before a physical address is generated. The virtual address registers and comparators allow for an economic memory which is compatible with virtual memory systems. A virtual memory system may include physical address registers and associated comparators in addition to the virtual address registers to allow direct access of shared data locations where there is no match in virtual addresses.

In one system, a controller is associated with each of the plural memory banks and a single memory management unit is associated with the system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
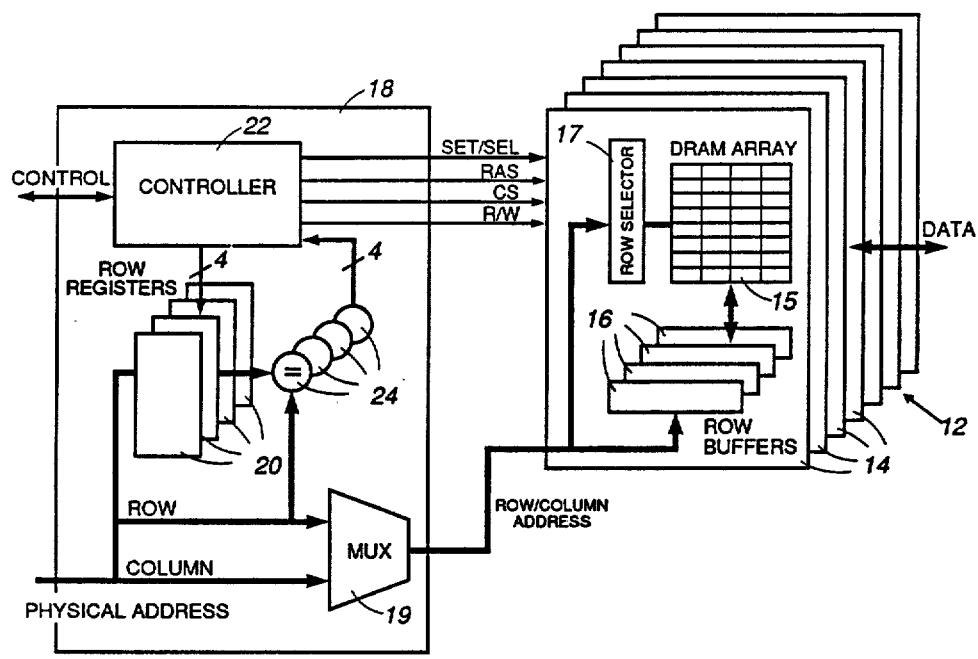
FIG. 1 is a schematic illustration of a memory system embodying the present invention.

FIG. 1 illustrates an embodiment of the present invention suitable for a physical memory system. The system shown includes a bank 12 of dynamic random access memory chips 14, each of which has a charge array memory 15. Each chip is of the static column dynamic RAM type except that it further includes plural row buffers 16. Preferably, $2^n$ buffers are provided. Additionally, each memory chip includes n additional input pins SET/SEL for selecting one of the $2^n$ buffers. $2^n$ is considered to be the set size of the memory using accepted cache terminology. The binary data on the set select inputs is significant during static accesses as well as at each edge of the row address strobe (RAS) signal. During static accesses, the additional SET/SEL inputs select the row buffers to be accessed. On the rising edge of RAS, the selected row buffer is filled from the row of the dynamic charge array dictated by the address lines through a row selector 17. On the falling edge of RAS, SET/SEL selects the row buffer which carries the data to be written into the addressed row of the charge array. Thus, by use of appropriate circuitry, which in FIG. 1 is shown to be off-chip, the static buffers of each memory chip may be used to hold a corresponding number of arbitrarily chosen rows of memory.

Because arbitrary rows may be stored in any selected data buffer, the static buffers may serve as a set associative cache, and the contention problems resulting from the direct mapped nature of Goodman and Chiang memory systems is mitigated. A system may alternate between different rows of the RAM array without requiring that those rows be alternately re-stored in a single buffer; the rows may be retained simultaneously in the plural data buffers.

An advantage of the system over conventional cache systems is that a full row of data from adjacent storage elements, not just a single bit per memory chip, can be addressed and held in the buffers which serve as cache memory. The resultant large number of bytes which are then stored in the data buffers of a bank of chips is obtained using the otherwise necessary on-chip leads to the array and RAS circuitry for direct access to storage elements of the array. Yet, only a single data pin per chip need be provided to access one of the many bytes in cache.

In this embodiment, the control circuitry for generating the SET/SEL signal as well as the RAS, chip select(CS), and read/write (R/W) signals is formed on a separate chip 18. Multiplexed row and column addresses are applied through a multiplexer 19. The control chip includes a set of row address registers 20 which store the row addresses corresponding to the rows of the array from which data is taken to fill the data buffers 16. Thus, each row address register 20 corresponds directly to one of the row data buffers 16.

When controller logic 22 on the control chip 18 selects one of the data buffers 16 to receive data from the RAM array 15, it also selects the corresponding row address register to receive and store the row address. Each time the memory system is accessed, the row address received by the system is compared in each of four comparators 24 with the row address stored in each of the row address registers. If the incoming row address equals any of the stored addresses, the controller recognizes that the required row of data is already stored in a data buffer and immediately selects that buffer through the SET/SEL line. In response to control signals received from the central processing unit, the controller also properly sets the R/W line and the CS line to allow one bit of the selected row, determined by the column address, to be provided at the output of each chip. Like control signals are applied to the full bank 12 of chips so that a full byte may be read from the memory bank.

In the event that the comparison does not indicate that the desired row is stored in any of the data buffers, the controller 22 selects one of the data buffers and initiates a RAS cycle to read the data from the row indicated on the row address line into the selected data buffer. Also, a corresponding row address register is selected, and the row address on the row address line is stored in that register. Only after the RAS cycle is complete does the controller initiate the column strobe to read from or write into the selected buffer.

Choice of a data buffer to receive data and the corresponding address register may be made according to standard cache replacement strategies. Examples of suitable replacement strategies are "least recently used" and "pseudo-random" replacements.

Figure 2:
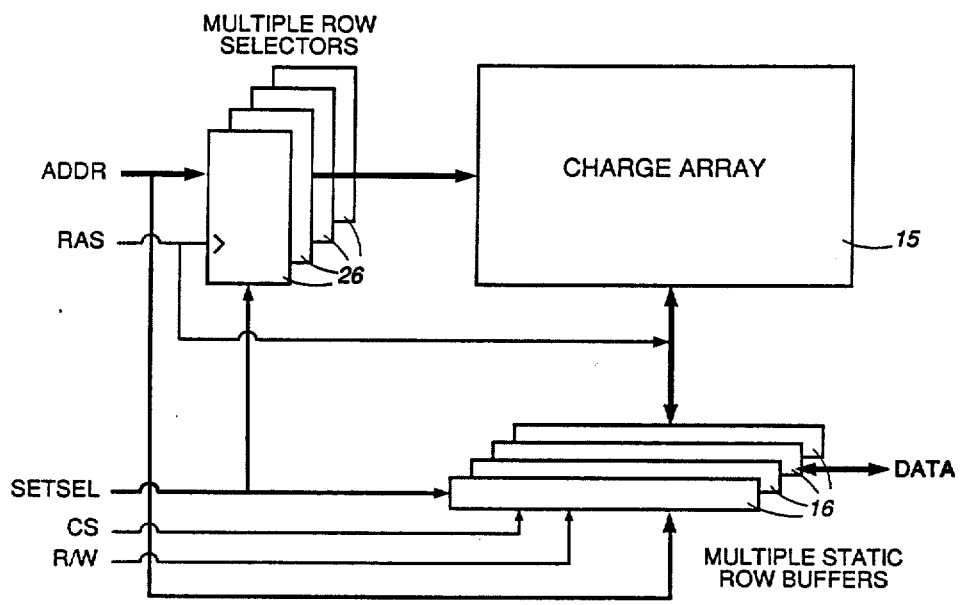
FIG. 2 is a schematic illustration of an alternative memory chip to be used in the system of FIG. 1.

FIG. 2 illustrates an alternative design of the memory chip. In this design, plural registers 26 are provided on the chip to store the same row addresses stored in the row address registers 20. These registers 26 enable selection and addressing of a row in the memory array 15 even after the row address has been removed from the input.

Figure 3:
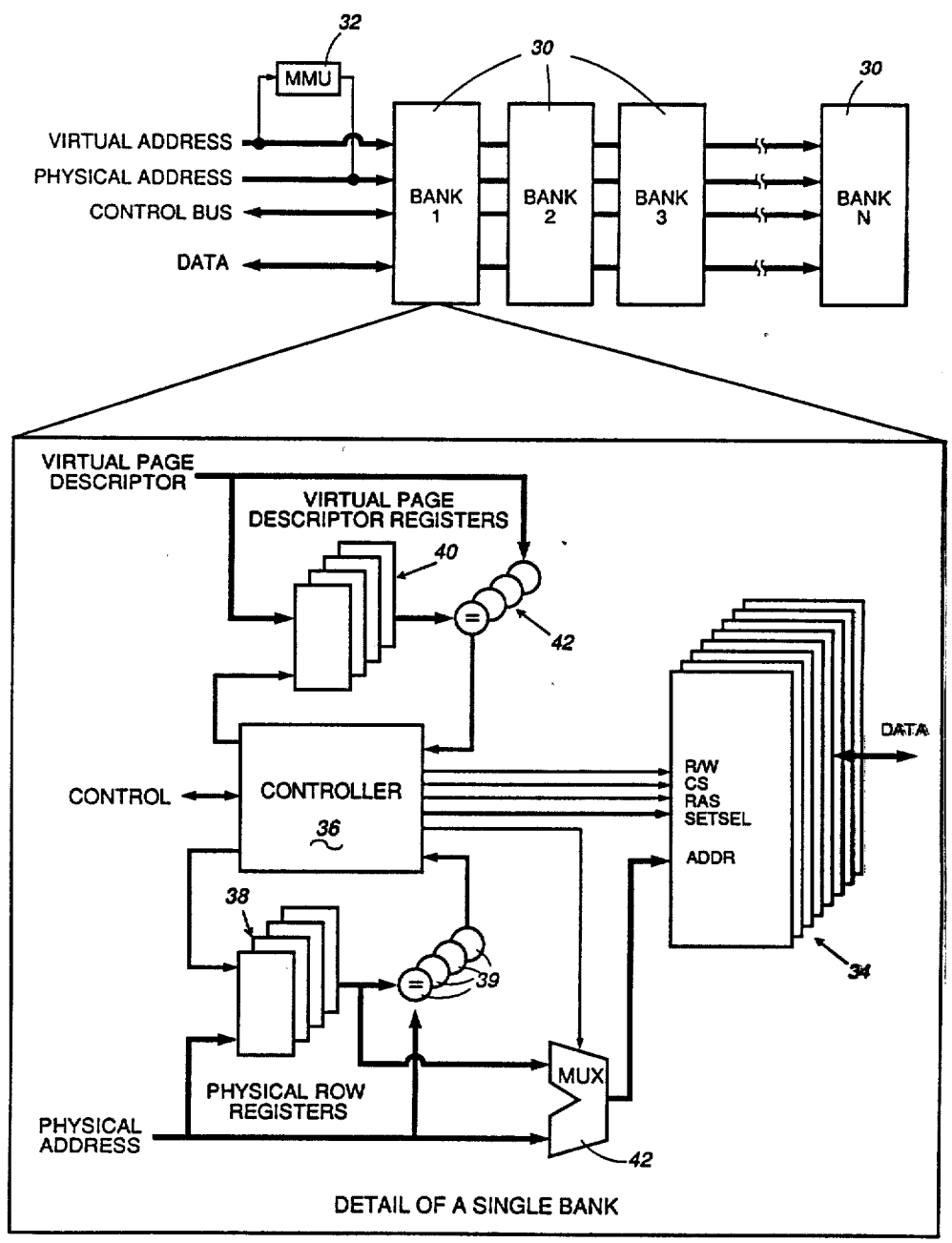
FIG. 3 is a schematic illustration of a memory system embodying the present invention and for use with virtual addresses.

A system which allows for a cache memory responsive to virtual memory addresses and which includes plural banks of memories is illustrated in FIG. 3. This system includes N banks and the detail of one bank of the system is illustrated in the lower portion of the drawing. They system receives a virtual address from the CPU, and a memory management unit 32 generates a physical address from the virtual address for accessing data from each of the memory banks. There are k virtual bits identical to the corresponding bits of the translated physical address. Typically, $2^k$ is the page size. In the present system, k must be large enough to include the column address bits of the RAMS. This constraint assures that the contents of any static row data buffer are contained within some virtual page and that the column address of a location can be determined directly from unmapped virtual address bits. The remaining virtual address bits are the virtual page descriptors.

In the system of FIG. 3, a bank of memory chips 34 may be identical to the bank 12 of FIG. 1. Although the memory arrays within the chips of the bank 34 can only be accessed by physical addresses, the controller 36 can determine whether the required data is stored in a data buffer and can identify the buffer in which such data is stored based on an analysis of the virtual page descriptor of the virtual address. Thus, as the control circuit maintains the physical addresses of the rows stored in the data buffers in plural physical row registers 38, it also maintains the virtual page descriptors of those same data rows in plural virtual page descriptor registers 40.

When the virtual address is received, and while it is being translated to a physical address by the memory management unit 32, the virtual address is immediately compared in comparators 42 with the virtual page descriptors stored in the registers 40. If there is a match, the controller 36 immediately selects the proper one of the data buffers in the memory chips and initiates a column access even before the physical address is generated. Thus, the data is accessed from the static row buffers with the speed of a cache memory access. If, however, there is no match between the incoming virtual address and the store virtual page descriptors, the subsequently generated physical address is compared in comparators 39 with the physical addresses stored in the registers 38. Again, if there is a match, the row buffer indicated by the row register 38 can be promptly selected without any RAS cycle. If there is no match in either set of address registers, a RAS operation must be initiated.

The comparison of physical addresses is made, for example, because a common block of physical memory may be shared by different virtual addresses. To reduce the complexity of the system, one may rely only on a comparison of virtual addresses to determine whether a cache operation is possible, and if no comparison is made between virtual addresses, the memory chip 34 may be accessed with the generated physical address through a RAS cycle. Such an approach may result in occasional unnecessary RAS cycles but eliminates the registers 38 and comparators 39.

In the system of FIG. 3, a multiplexor 42 is provided to select either the incoming physical address or an address from the address registers 20.

While this invention has been particularly shown and described with references to preferred embodiments thereof, it will be understood by those skilled in the art that various changes in form and details may be made therein without departing from the spirit and scope of the invention as defined by the appended claims. For example, the memory array may be implemented as several subarrays of smaller dimensions. Rather than associating a single controller device with each of several banks of set associative memory devices, a single controller device may control all of the banks of memory devices and also generate a bank select signal in addition to the signals described above. Minor variations in the timing of signals to accommodate circuit details and device specifications, such as set-up and hold times, and additional control signals may be supplied to the memory devices by the control circuitry to meet specific memory design considerations.

The conventions by which information is signalled to the memory devices may be varied. Row and column address information may occupy separate lines rather than be multiplexed as onto a single set of address lines. Other control information and data may be multiplexed onto shared lines or occupy dedicated lines. Certain information, such as the SET/SEL line and bank select lines, may be carried in binary code or decoded form.

The invention may be applied to an array of read only memory cells rather than the dynamic RAM array shown to yield an improved performance read only memory system. Practical implementations would incorporate semiconductor chips containing multiple static buffers in addition to conventional masked programmable or electrically alterable read only cells.

We claim:

1. A memory comprising:

a memory array logically arranged as rows and columns of storage elements addressable by row addresses, each element being capable of storing a single bit of data, each row of storage elements being directly accessible independent of other rows;

means responsive to row addresses received by memory for directly addressing rows of storage elements of the array for storage of rows in data buffers;

a plurality of data buffers, each data buffer being connected to the memory array to receive and store a row of data from any addressed row of the array and to provide data as an output of the memory;

means for selecting one of the data buffers to receive and store data from the memory array;

means responsive to a column address for addressing bits within a selected data buffer to access the data stored in an addressed location;

a plurality of address registers for storing row addresses of rows of the memory array of data stored in the data buffers;

comparator means for comparing received addresses with addressses stored in the address registers to determine whether data to be addressed by a received row address is retained in a data buffer; and control means for causing a read from the memory array to a selected buffer when the row indicated by the received row address is not stored in a data buffer and for selecting a data buffer for direct access when the data is already stored in the buffer.

2. A memory as claimed in claim 1 wherein the memory array and data buffers are formed on a semiconductor chip.

3. A memory as claimed in claim 2 wherein the means for selecting one of the data buffers comprises at least one select terminal for receiving an input to the semiconductor chip.

4. A memory as claimed in claim 1 wherein the memory array and data buffers are formed on a memory chip, and the row address registers, the comparator means, and the control means are formed on a separate controller chip.

5. A memory as claimed in claim 1 wherein the address registers store virtual addresses corresponding to the row addresses of data stored in the data buffers and wherein the control means causes a read from the memory array to a selected buffer based on a physical address where the row being addressed is not stored in the data buffer and selects a buffer for direct access where the virtual address indicates that the data is already stored in the buffer.

6. A memory as claimed in claim 5 comprising separate virtual address registers and physical address registers, an initial comparison being made of a received virtual address to the addresses stored in the virtual address registers and a subsequent comparison being made of received physical addresses to the addresses stored in the physical address registers where the comparison of virtual addresses does not indicate that the data to be addressed is already stored in the data buffer.

7. A memory as claimed in claim 5 comprising plural banks of memory arrays, there being a single memory management unit associated with the plural banks of memory arrays to translate virtual addresses to physical addresses.

8. A memory as claimed in claim 7 comprising a separate virtual address register, comparator means and control means associated with each bank.

9. A memory as claimed in claim 1 further comprising means for storing data in the storage elements from the data buffer such that the memory is a random access memory.

10. A random access memory comprising:
on a single semiconductor chip, a dynamic memory array logically arranged as rows and columns of storage elements addressable by row addresses, each row being directly accessible independent of other rows, and a plurality of static data buffers for storing data to be accessed by column addresses, each data buffer being connected to the memory array to receive and store a row of data from any addressed row of the array, to provide data as an output of the memory, to receive data as an input to the memory and to apply data to an addressed row of the array;
means responsive to row addresses received by memory for directly addressing rows of the array for storage of rows in the data buffers;
means for selecting one of the data buffers to receive and store data from addressed rows of the memory array;
a plurality of address registers for storing row addresses of rows of the memory array of data stored in data buffers;
comparator means for comparing received row addresses with addresses stored in the address registers to determine whether data to be addressed by a received row address is retained in a data buffer; and
control means for causing a read from the memory array to a selected buffer when the row indicated by the received row address is not stored in a data buffer and for selecting a data buffer for direct access to the buffer with column addresses when the data is already stored in the buffer.

11. A memory as claimed in claim 10 wherein the address registers store virtual addresses corresponding to the row addresses of data stored in the data buffers and wherein the control means causes a read from the memory array to a selected buffer and selects a buffer for direct access where the virtual address indicates that the data is already stored in the buffer.

12. A memory as claimed in claim 11 comprising separate virtual address registers and physical address registers, an initial comparison being made of a received virtual address to the addresses stored in the virtual address registers and a subsequent comparison being made of received physical addresses to the addresses stored in the physical address registers where the comparison of virtual addresses does not indicate that the data to be addressed is already stored in the data buffer.

13. A memory comprising, on a single semiconductor chip:
a memory array logically arranged as rows and columns of storage elements addressible by row addresses, each row being directly accessible independent of other rows;
means responsive to row addresses received by memory for directly addressing rows of the array for storage of rows in data buffers;
a plurality of data buffers, each data buffer being connected to the memory array to receive and store a row of data from any addressed row of the array and to provide data as an output of the memory;
means for selecting one of the data buffers to receive and store data from the memory array and to output data from the memory array; and
means responsive to a column address for addressing bits of data from a selected data buffer.

14. A memory as claimed in claim 13 wherein the means for selecting one of the data buffers comprises at least one select terminal for receiving an input to the semiconductor chip.

15. A memory as claimed in claim 13 wherein the memory array and data buffers are formed on a memory chip which further comprises row address registers for storing the addresses of rows corresponding to the data in the data buffers.

16. A memory as claimed in claim 13 wherein the memory array is of dynamic charge elements and the data buffers are static buffers.

17. A memory as claimed in claim 13 further comprising means for storing data in the storage elements from the data buffer such that the memory is a random access memory.

18. A random access memory comprising:
a dynamic memory array of dynamic charge elements logically arranged as rows and columns addressable by row addresses, each row of dynamic charge elements being directly accessible independent of other rows;
means responsive to row addresses received by memory for addressing rows of the array for storage of rows in data buffers;
a plurality of static data buffers for storing data to be accessed by column addresses each data buffer being connected to the memory array to receive and store a row of data from any addressed row of the array, to provide data as an output of the memory, to receive data as an input to the memory and to apply data to an addressed row of the array;
means for selecting one of the data buffers to receive and store data from the memory array; and
means responsive to a column address for addressing locations within a selected data buffer to access the data stored in an addressed location.

19. A random access memory device comprising, on a single semiconductor chip:
a plurality of dynamic charge elements, each capable of storing a single bit of data;
a plurality of static buffers, each of which is capable of holding a plurality of data bits;
means responsive to range addresses received by memory for directly addressing a range of said dynamic charge elements equal in number to the capacity of each static buffer, independently of others of said dynamic charge elements, for storage of data bits in said static buffers;
means for selecting one of said static buffers;
means for selectively loading or storing said data bits of said addressed range of dynamic charge elements to or from the selected static buffer;
at least one data line; and means responsive to a charge element address for addressing locations within the selected static buffer, for reading data bits from said addressed locations to said data lines and for writing data bits to said addressed locations from said data lines.

20. A memory device as claimed in claim 19 wherein:
the dynamic charge elements are logically arranged in rows and columns in at least one rectangular array; and
the capacity of each static buffer corresponds to that of a single row in the dynamic charge array;
said means for addressing a range of dynamic charge elements selects a single row from within the charge array.

21. A memory device as claimed in claim 20 wherein:
the means for selecting one of the static buffers comprises one or more input terminals to the chip; and
a single set of address terminals provides both the means for addressing a range of charge elements and the means for addressing locations within the selected static buffer.

22. A memory device as claimed in claim 19 wherein:
the means for selecting one of the static buffers comprises one or more input terminals to the chip.

23. A memory device as claimed in claim 19 wherein:
a single set of address terminals provides both the means for addressing a range of charge elements and the means for addressing locations within the selected static buffer.

24. A memory device as claimed in claim 19 further comprising:
a plurality of address buffers equal in number to the number of static buffers, each capable of storing the address of one of said ranges of dynamic charge elements;
means for recording in each of said address registers the range of charge elements contained in its corresponding buffer; and
means for storing the contents of the selected static buffer into the range of charge elements specified by the contents of its corresponding address register.

25. A memory device as claimed in claim 24 wherein:
the means for selecting one of the static buffers comprises one or more input terminals to the chip; and
a single set of address terminals provides both the means for addressing a range of charge elements and the means for addressing locations within the selected static buffer.

26. A memory device as claimed in claim 25 further comprising:
an input row address strobe signal which assumes one of two states to specify whether said single set of address terminals is to address said range of charge elements or said locations within the selected static buffer, a transition in one direction on said strobe input causing said addressed range of charge elements to be copied into said selected static buffer and a transition in the other direction on said strobe input causing the contents of said selected static buffer to be written into a range of charge elements.

27. A random access memory device comprising:
a plurality a dynamic charge elements, each capable of storing a single bit of data;
a plurality of static buffers, each of which is capable of holding a plurality of data bits;
means responsive to range addresses received by memory for directly addressing a range of adjacent dynamic charge elements independently of others of said dynamic charge elements, for storing of data bits in said static buffers;
means for selecting one of said static buffers;
means for selectively loading or storing said data bits of said addressed range of dynamic charge elements to or from the selected static buffer;
at least one data line; and
means responsive to a charge element address for addressing locations within the selected static buffer, for reading data bits from said addressed locations to said data lines and for writing data bits to said addressed locations from said data lines.

28. A memory device as claimed in claim 27 wherein:
the dynamic charge elements are logically arranged in rows and columns in at least one rectangular array;
the capacity of each static buffer corresponds to that of a single row in the dynamic charge array; and
said means for addressing a range of dynamic charge elements selects a single row from within the charge array.

29. A memory device as claimed in claim 27 wherein:
the means for selecting one of the static buffers comprises one or more input terminals to the chip; and
a single set of address terminals provides both the means for addressing a range of charge elements and the means for addressing locations within the selected static buffer.

30. A memory device as claimed in claim 27 wherein:
the means for selecting one of the static buffers comprises one or more input terminals to the chip.

31. A memory device as claimed in claim 27 wherein:
a single set of address terminals provides both the means for addressing a range of charge elements and the means for addressing locations within the selected static buffer.

32. A memory device as claimed in claim 27 further comprising:
a plurality of address buffers equal in number to the number of static buffers, each capable of storing the address of one of said ranges of dynamic charge elements;
means for recording in each of said address registers the range of charge elements contained in its corresponding buffer; and
means for storing the contents of the selected static buffer into the range of charge elements specified by the contents of its corresponding address register.

33. A memory device as claimed in claim 27 wherein:
the means for selecting one of the static buffers comprises one or more input terminals to the chip; and
a single set of address terminals provides both the means for addressing a range of charge elements and the means for addressing locations within the selected static buffer.

34. A memory device as claimed in claim 27 further comprising:
an input row address strobe signal which assumes one of two states to specify whether said single set of address terminals is to address said range of charge elements or said locations within the selected static buffer, a transition in one direction on said strobe input causing said addressed range of charge elements to be copied into said selected static buffer and a transition in the other direction of said strobe input causing the contents of said selected static buffer to be written into a range of charge elements.

35. A memory device comprising, on a single semiconductor chip:
a plurality of memory elements, each capable of storing a single bit of data;
a plurality of static buffers, each of which is capable of holding a plurality of data bits;
means responsive to range addresses received by memory for directly addressing a range of memory elements, equal in number to the capacity of each static buffer, for storage of data bits in said static buffers;
means for selecting one of said static buffers;
means for selectively loading data from said addressed range of memory elements into a selected static buffer;
at least one data line; and
means responsive to a memory element address for addressing locations within the selected static buffer, and for reading data from said addressed locations onto said data lines.

36. A memory device comprising:
a plurality of memory elements, each capable of storing a single bit of data;
a plurality of static buffers, each of which is capable of holding a plurality of data bits;
means responsive to range addresses received by memory for directly addressing a range of adjacent memory elements, for storage of data bits in said static buffers;
means for selecting one of said static buffers;
means for selectively loading data from said addressed range of elements into a selected static buffer;
at least one data line; and
means responsive to a memory element address for addressing locations within the selected static buffer, and for reading data from said addressed locations onto said data lines.

37. A memory controller chip comprising:
input lines for a memory address;
a plurality of address registers for holding addresses from the input lines;
a plurality of comparators, each of which compares an incoming address on the address lines with the contents of a corresponding one of the address registers;
set select output signals for selecting one of a plurality of static buffers contained within an external bank of dynamic memory devices in response to the comparison of addresses;
memory control output signals for signaling the reading and writing of the contents of the selected buffers from and to an external dynamic memory;
logic which generates said control signals so as to access said static buffers directly if said comparators indicate a match with the incoming address; and
logic which selects a buffer to be reloaded, generates said control signals so as to replace the previous contents of the selected buffer into the dynamic memory and read new contents containing the addressed location if said comparators do not indicate a match with the incoming address.

38. A controller as claimed in claim 37 wherein the address registers and comparators include a plurality of virtual address registers and comparators and a plurality of physical address registers and comparators.

39. A method of accessing a dynamic random access memory for read and write operations, the memory having an array of memory elements, each element storing a bit of information, logically arranged as rows and columns, the method comprising:
directly addressing rows of the array and storing addressed rows of data in respective ones of a plurality of data buffers;
on each read or write operation, comparing a received address with each of the addresses of data stored in the data buffers to determine whether data to be addressed is retained in a data buffer; and
addressing the memory array to read a row of data indicated by the received address to store the data in a selected data buffer for access when the row indicated by the received address is not previously stored in a data buffer and selecting a data buffer for direct access when the data is already stored in the buffer.

40. A method as claimed in claim 39 wherein virtual addresses are compared with addresses of data stored in the data buffers.

41. A method as claimed in claim 39 further comprising, where the row indicated by the received address is not stored in a data buffer, writing the contents of a selected data buffer into a row of the memory array prior to reading the row indicated by the received address from the array.

* * * * *